No. 652,781. Patented July 3, 1900.
H. DE B. JOHNSON.
DEVICE FOR HEATING WHEEL TIRES.
(Application filed Aug. 31, 1899.)
(No Model.)
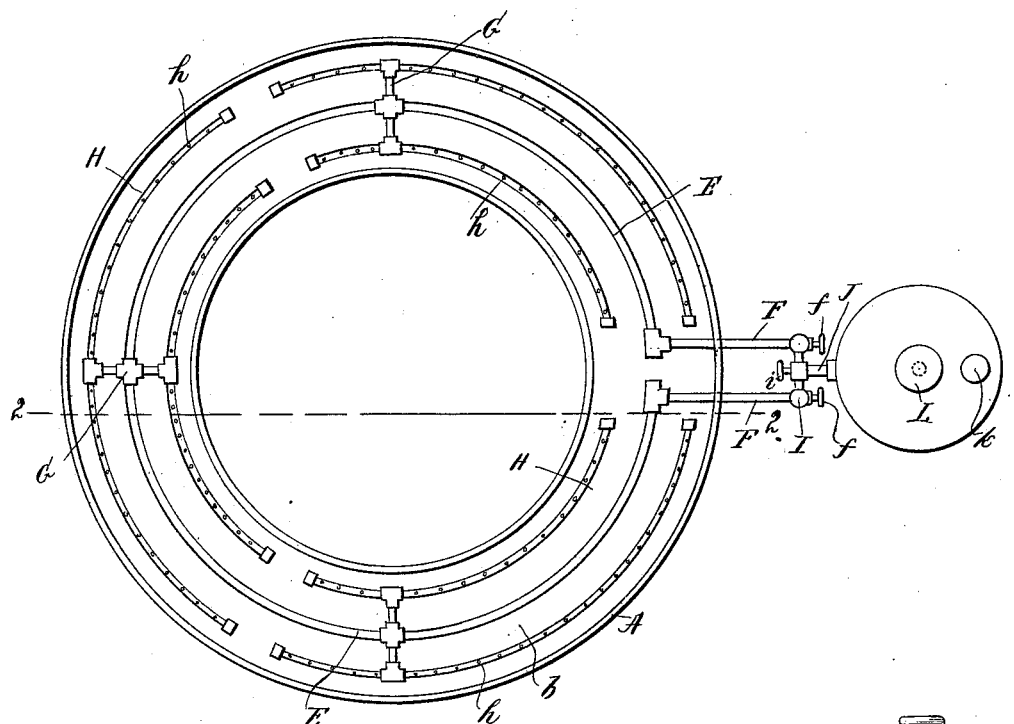
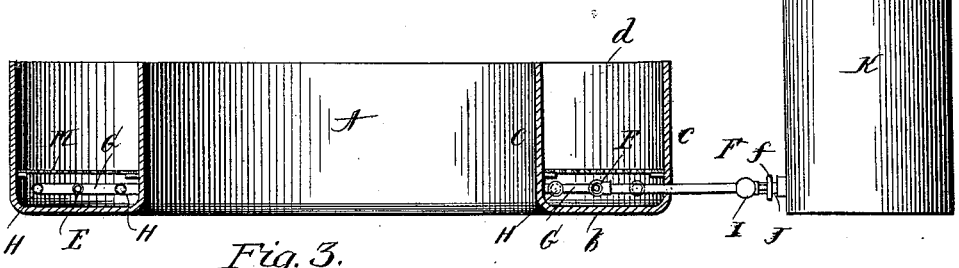
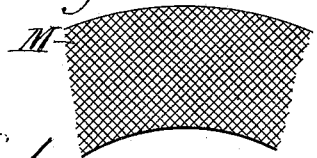
WITNESSES
INVENTOR
Henry De B. Johnson
BY
Edgar Tate & Co.
ATTORNEYS.
THE NORRIS PETERS CO., PHOTO-LITHO., WASHINGTON, D. C.

UNITED STATES PATENT OFFICE.

HENRY DE BARN JOHNSON, OF PIERMONT, NEW YORK.

DEVICE FOR HEATING WHEEL-TIRES.

SPECIFICATION forming part of Letters Patent No. 652,781, dated July 3, 1900.

Application filed August 31, 1899. Serial No. 729,072. (No model.)

*To all whom it may concern:*

Be it known that I, HENRY DE BARN JOHNSON, a citizen of the United States, residing at Piermont, in the county of Rockland and State of New York, have invented certain new and useful Improvements in Devices for Heating Wheel-Tires, of which the following is a full and complete specification, such as will enable those skilled in the art to which it appertains to make and use the same.

This invention relates to devices for heating wheel-tires; and it has for its object to provide a simple and improved apparatus or device of this character which will be especially adapted for convenient and effective operation and for the employment of gasolene.

The invention is fully disclosed in the following specification, of which the accompanying drawings form a part, in which the separate parts of my improvement are designated by the same letters of reference in each of the views, and in which—

Figure 1 is a top or plan view of my improved device. Fig. 2 is a transverse sectional view, and Fig. 3 is a partial plan view of a portion of Fig. 2.

In the drawings forming part of this specification, A designates an annular trough or receptacle, which is preferably formed of metal, (it may be a casting,) having a bottom $b$ and sides $c$ $c$, the same forming, substantially, a ring with an open top, as at $d$, and being adapted to receive the tires.

In the bottom of the trough A is mounted a main pipe E, which forms nearly a complete circle, as clearly shown in Fig. 1, and from the adjacent terminal ends of this pipe extend, respectively, two lateral branch pipes F, leading through the outer wall $c$ of the trough. The main pipe E is intersected at different points within the trough by transverse branch pipes G, which project at both sides of the pipe E and respectively carry a series of segmental pipes H, having openings $h$ in their top, forming gas burners or jets. The branch pipes F are connected at their outer ends by a cross-pipe I, which is intersected by a branch pipe J, leading to an oil-reservoir K, which is provided with a suitable inlet $k$, by which it may be filled with kerosene or other oil, and is also provided with a suitable air-pump L for producing the desired interior pressure, whereby the oil will be fed through the pipes. The cross-pipe I is provided with a cock or valve $i$, and each of the lateral branch pipes F is likewise provided with a cock or valve $f$. I preferably provide a shelf or grating, as at M, Fig. 2, mounted within the trough or receptacle A above the set of pipes E, G, and H, upon which the tires can be placed, this shelf serving to prevent damage to the pipes by the tires.

It will be understood that in operation the tires to be heated are placed within the receptacle A. The oil feeds under pressure to the main pipe E and from thence through the branch pipes G to the pipes H. In starting the apparatus in its initial operation the oil will flow into the pipes H and be lighted at the jets $h$ and in a short time the radiated heat will act upon the main pipe E and cause a generation of gas therein, which will pass to the pipes H, and thereafter oil will cease flowing to the pipes H, but they will be fed from the generated gas.

Having fully described my invention, I claim as new and desire to secure by Letters Patent—

1. An improved device for heating wheel-tires, comprising an annular or ring-shaped trough or receptacle, an approximately-circular main pipe arranged therein and provided with lateral branch pipes, segmental auxiliary pipes connected with said lateral branch pipes and extending at both sides of the main pipe and provided with gas jets or openings, an oil-reservoir, a pneumatic forcing device communicating therewith and a pipe connection between said oil-reservoir and the main pipe, substantially as shown and described.

2. An improved device for heating wheel-tires, comprising an annular or ring-shaped trough or receptacle, an approximately-circular main pipe arranged therein, a series of segmental auxiliary pipes extending at the sides of the main pipe and connected therewith and provided with gas jets or openings, and means for feeding oil to said main pipe, substantially as and for the purpose set forth.

In testimony that I claim the foregoing as my invention I have signed my name, in presence of the subscribing witnesses, this 28th day of August, 1899.

HENRY DE BARN JOHNSON.

Witnesses:
AMANDA A. GOWDEY,
CHARLES A. WEEKES.